United States Patent
Nabert

(10) Patent No.: US 7,464,979 B2
(45) Date of Patent: Dec. 16, 2008

(54) WIND DEFLECTING DEVICE

(75) Inventor: Bernd Nabert, Schopfloch (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 11/879,052

(22) Filed: Jul. 16, 2007

(65) Prior Publication Data

US 2008/0012385 A1   Jan. 17, 2008

(30) Foreign Application Priority Data

Jul. 14, 2006 (DE) .................. 10 2006 032 809

(51) Int. Cl.
   *B60J 1/20* (2006.01)
(52) U.S. Cl. ..................... 296/91; 296/180.1
(58) Field of Classification Search .......... 296/91, 296/180.1, 180.2, 180.3, 78.1, 95.1
   See application file for complete search history.

(56) References Cited

U.S. PATENT DOCUMENTS

| 3,214,215 A | * | 10/1965 | Hansen ........................ 296/91 |
| 3,862,777 A | * | 1/1975 | Schifano ....................... 296/91 |
| 4,043,587 A | * | 8/1977 | Giallourakis et al. .......... 296/91 |
| 4,142,758 A | * | 3/1979 | Scaife ......................... 296/91 |
| 4,466,654 A | * | 8/1984 | Abe ............................ 296/192 |
| 4,471,991 A | * | 9/1984 | Matthias ...................... 296/91 |
| 4,521,050 A |   | 6/1985 | Rea et al. |
| 4,929,013 A | * | 5/1990 | Eke ............................. 296/91 |
| 4,952,006 A | * | 8/1990 | Willey ......................... 296/91 |
| 5,052,745 A | * | 10/1991 | Preiss ....................... 296/180.5 |
| 5,082,321 A | * | 1/1992 | Brewer ....................... 296/91 |
| 5,544,931 A | * | 8/1996 | Nelson .................... 296/180.1 |
| 5,667,271 A | * | 9/1997 | Booth ........................ 296/192 |
| 5,702,149 A | * | 12/1997 | Sweeney ..................... 296/152 |
| 6,155,627 A | * | 12/2000 | Vassell ...................... 296/95.1 |
| 6,899,376 B1 | * | 5/2005 | Sullivan ...................... 296/91 |
| 7,344,183 B2 | * | 3/2008 | Brash ....................... 296/180.1 |

FOREIGN PATENT DOCUMENTS

| DE | 1 405 875 | 10/1969 |
| DE | 28 35 802 A1 | 2/1980 |
| EP | 0099115 A2 | 1/1984 |
| EP | 0099115 A3 | 1/1984 |

OTHER PUBLICATIONS

European Search Report dated Jan. 14, 2008.

* cited by examiner

*Primary Examiner*—Kiran B. Patel

(57) ABSTRACT

A wind-deflecting and wind-guiding device is disposed in the region of a windshield of a motor vehicle. The device is formed, in particular, as a cowling extending in the transverse direction of the vehicle. A prestressing device biases lateral longitudinal end regions of the wind-deflecting device in the direction of the vehicle and in the direction of the windshield and, as a result, effectively prevents said longitudinal end regions from lifting off, even under temperature loadings.

10 Claims, 1 Drawing Sheet

WIND DEFLECTING DEVICE

CROSS-REFERENCE TO RELATED APPLICATION

This application claims the priority, under 35 U.S.C. § 119, of German patent application DE 10 2006 032 809.4, filed Jul. 14, 2006; the prior application is herewith incorporated by reference in its entirety.

BACKGROUND OF THE INVENTION

Field of the Invention

The invention lies in the automotive technology field. More specifically, the present invention relates to a wind-deflecting device disposed in the vicinity of a windshield of a motor vehicle.

German published patent application DE 28 35 802 A1 discloses a rail which bears against a thin vehicle wall, serves for stiffening purposes and the central part of which has greater strength than its ends, because of a profiled structure which peters out towards the ends. In order to prevent the vehicle wall from fluttering during the driving operation of the motor vehicle, the ends of the rail are each shaped to form an eye which has a noncircular shape and onto which a limb which is made from resilient material and is supported with prestress on a fixed vehicle part is pushed. This creates a hinge-like connection between the rail and the limb supported on the end side, with the eye forming a hinge pin.

German published, prosecuted patent application DE 1 405 875 likewise discloses an apparatus for stiffening thin walls of vehicles, with a rail which is composed of a resilient material, bears against the part to be stiffened, is provided with at least one longitudinal bead and the central part of which has a harder spring characteristic than its ends attached to fixed vehicle parts. In order to stiffen the thin wall in such a manner that neither a fluttering of the thin wall nor indentation of the wall occurs, the rail, which is produced from spring bound steel, has at least one uninterrupted bead which becomes flatter at its ends, and resilient end sections with a rectangular cross section that are inserted into slots of the fixed vehicle parts with the end sections being prestressed.

In particular in the case of light covering parts, such as, for example, of a wind-deflecting device which is also included in the region of thin walls/components on vehicles, a corresponding effective temperature may result in lateral end regions lifting off, which can firstly produce unattractive gaps and secondly can unfavorably influence the wind-deflecting properties of the wind-deflecting device.

SUMMARY OF THE INVENTION

It is, accordingly, an object of the invention to provide a wind deflecting or guiding device that overcomes the above-noted and other disadvantages of the prior art and which provides an improved embodiment that is distinguished in particular in that its lateral end regions are prevented from lifting off under effects of temperature.

This and other objects are achieved, in accordance with the invention, in that there is provided a wind-deflecting or wind-guiding device disposed in a region of a windshield of a motor vehicle. The wind-deflecting device comprising a prestressing device configured and disposed to bias longitudinal end regions of the wind-deflecting device in a direction towards the vehicle. The device is, in particular, a cowling that is disposed to extend in a transverse direction of the vehicle.

The present invention is based on the general concept of providing, in the case of a wind-deflecting device arranged in the region of a windshield of a motor vehicle, a prestressing device which prestresses the lateral end regions of the wind-deflecting device against the motor vehicle, in particular against the windshield, in such a manner that said end regions cannot be detached from the windshield on account of a temperature loading stop. The prestressing device accordingly brings about a continuous prestressing of the lateral end regions against the windshield or against the bodywork, and therefore the position assumed by the wind-deflecting device during installation is maintained irrespective of the normally occurring temperatures. The invention therefore ensures that the wind- deflecting device cannot be detached from the windshield even in summer, for example at very high temperatures, and thereby causes an unaesthetic impression and causes a deterioration in the aerodynamic properties of the cowl device.

In an advantageous embodiment of the solution according to the invention, at least one spring element of the prestressing device is designed as a spring steel part or is produced from spring steel. Such a spring element which is produced from spring steel brings about a uniform prestressing force which remains constant over a long time and only changes insignificantly even in the case of large differences in temperature as can occur, for example, between summer and winter. Furthermore, a spring element produced from spring steel affords the advantage that, in comparison to other steels, the spring steel has greatly resilient properties and, as a result, is capable of absorbing significantly greater elastic deformations.

The spring element expediently engages at its end which faces away from the bodywork in an engagement means formed on the wind-deflecting device. This facilitates installation of the wind-deflecting device equipped with the prestressing device according to the invention, since the at least one spring element of the wind-deflecting device has merely to be connected fixedly at one end to the motor vehicle and there is a simple plug-in connection at the other end. In comparison to a fixed coupling of that end of the spring element which faces away from the bodywork, the solution of inserting this end into a pocket or an engagement means formed on the wind-deflecting device has the great advantage of certain displacement possibilities being possible here between spring element and wind-deflecting device or between spring element and a covering profile of the wind-deflecting device, as a result of which, for example, stresses occurring due to temperature fluctuations can be avoided.

In an advantageous embodiment of the solution according to the invention, a covering profile of the wind-deflecting device that is visible in the fitted state has at least one recessed fastening region at which the covering profile is connected fixedly to the bodywork and via which, in addition, the spring element is fixed on the bodywork. As a result, both the covering profile and the spring element can be fixed on the vehicle bodywork by one and the same fixing means, thus firstly reducing the outlay on installation and secondly enabling a reduction in the multiplicity of parts to be achieved.

Further important features and advantages of the invention emerge from the subclaims, from the drawings and from the associated description of the figures with reference to the drawings.

It goes without saying that the features mentioned above and those which have yet to be explained below can be used not only in the respectively stated combination but also in other combinations or on their own without departing from the scope of the present invention.

Other features which are considered as characteristic for the invention are set forth in the appended claims.

Although the invention is illustrated and described herein as embodied in wind-deflecting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
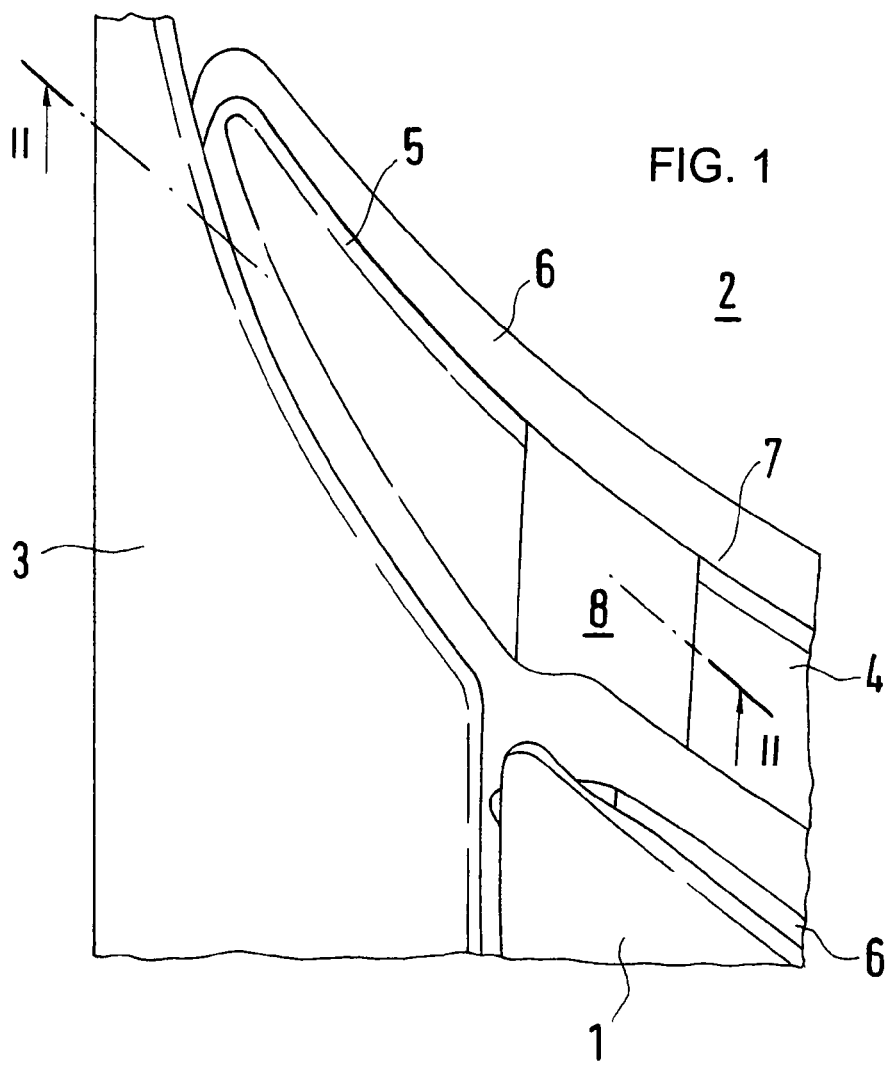
FIG. 1 shows a view of a wind-deflecting device according to the invention.

Referring now to the figures of the drawing in detail and first, particularly, to FIG. 1 thereof, there is shown a part of a lateral region of a transition from an engine hood 1 into a windshield 2 of a motor vehicle (otherwise not illustrated), with a wing 3 of the motor vehicle laterally adjoining the engine hood 1 in the transverse direction of the vehicle. A wind-deflecting device 4 which is to bring about an aerodynamically favorable transition between abovementioned components 1 and 3 and the windshield 2 is arranged in the region of a transition from the engine hood 1 or the wing 3 to the windshield 2. In this case, the wind-deflecting device 4 runs substantially in the transverse direction of the vehicle and on a lower edge of the windshield 2 and, in the region of a transition between the engine hood 1 and the wing 3, has a lateral end region 5 which extends along a connecting line between the windshield 2 and the wing 3. As likewise shown in FIG. 1, the wind-deflecting device 4 has substantially encircling flanges 6 which bear against the windshield 2 and, in the region of the wing 3 and the engine hood 1, are arranged below them. Thus there is created an aerodynamically particularly well designed transition zone.

Figure 2:
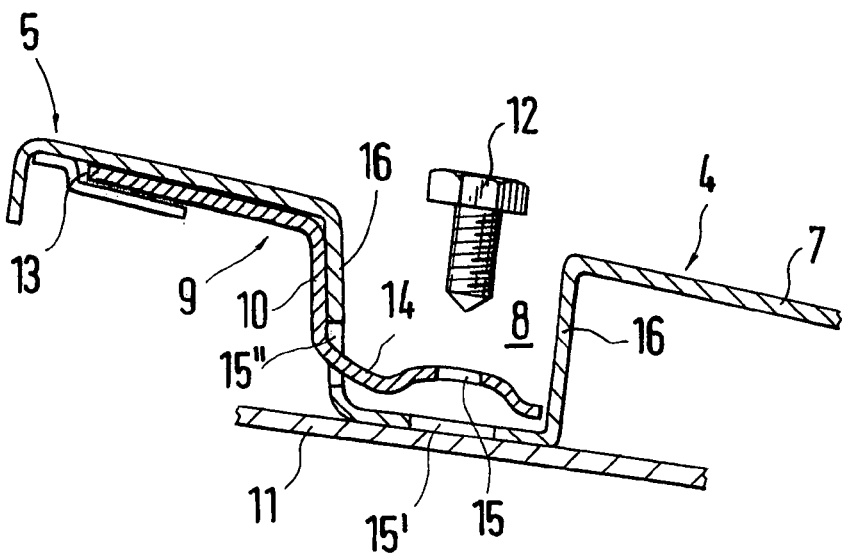
FIG. 2 shows a highly schematic sectional illustration along the line II-II in FIG. 1 through the wind-deflecting device.

That part of the wind-deflecting device 4 which is shown in FIG. 1 is a covering profile 7 which has at least one recessed fastening region 8 at which it is connected to the motor vehicle bodywork 11. This recessed fastening region 8 is also illustrated in FIG. 2. The wind-deflecting device 4 is usually connected to the bodywork 11 via two recessed fastening regions 8, with only one fastening region 8 being shown in FIGS. 1 and 2.

In particular in summer, i.e. at high temperatures, the lateral end regions 5 may lift off from the windshield 2 due to the temperature deformations and, as a result, unaesthetic gaps are produced between the covering profile 7 and windshield 2. Associated with the lateral end regions 5 of the covering profile 7 lifting off is a deterioration in the aerodynamic properties, and therefore such lifting off absolutely has to be avoided. In order to avoid the described lifting off of the lateral end regions 5, the wind-deflecting device 4 has a prestressing device 9 which prestresses the respective longitudinal end region 5 of the wind-deflecting device 4 and of the covering profile 7 in the direction of the windshield 2 and in the direction of the vehicle (FIG. 2).

The prestressing device 9 comprises, according to FIG. 2, at least one spring element 10, with normally two spring elements 10 being provided for the respective prestressing of the associated end region 5. A prestressing force of the spring element 10 is achieved by it preferably being designed as a spring steel part or being produced from spring steel. Spring steel of this type has higher elasticity in comparison to conventional steel and, as a result, can absorb relatively large elastic deformations. In general, however, other materials which can exert a high degree of elasticity and a corresponding prestressing force can also be used here. Furthermore, the resilient properties should also remain unchanged over a relatively large temperature window such that the spring element (10) reliably prestresses the end region 5 of the covering profile 7 in relation to the windshield 2 or in relation to the bodywork both in winter at low temperatures and in summer at very high temperatures.

As illustrated in FIG. 2, the spring element 10 is connected at one end to the motor vehicle bodywork 11 and at the other end to the wind-deflecting device 4 or the covering profile 7 of the same. The connection to the bodywork 11 takes place via a fixing means 12, for example a screw, whereas a connection between the spring element 10 and the covering profile 7 of the wind-deflecting device 4 takes place via an engagement means 13 in which the spring element 10 engages at its end which faces away from the bodywork 11, and which is arranged on the covering profile 7 of the wind-deflecting device 4 in a manner such that it is not visible from the outside.

The spring element 10, like the covering profile 7 of the wind-deflecting device 4, is connected to the bodywork 11 in the fastening region 8, with a common fixing means 12 being used to connect the two components 7 and 10 to the bodywork 11. In this case, a limb 14 of the spring element 10 of Z-shaped design is provided with a passage opening 15 which aligns with a passage opening 15' arranged in the recessed fastening region 8 of the covering profile 7 and, as a result, makes it possible for the spring element 10 and the covering profile 7 to be connected together to the bodywork 11. In the region of the passage opening 15 of the limb 14, the latter is curved, to be precise is designed such that it is curved away from the bodywork 11, as a result of which a prestress which acts on the fixing means 12 is produced during tightening of the same, and therefore the fixing means 12 cannot be automatically released in the fitted state.

A sidewall 16 of the recessed fastening region 8 has, as illustrated in FIG. 2, a further through opening 15" through which the limb 14 of the spring element 10 reaches. This through opening 15" makes it possible for the spring element 10 to be visible from the outside only in the region of the recessed fastening region 8 whereas it otherwise runs within the covering profile 7 in a manner such that it is not visible.

In summary, the primarily important features of the solution according to the invention can be characterized as follows:

In order to be able to effectively prevent lateral end regions 5 of a covering profile 7 belonging to a wind-guiding or wind-deflecting device 4 from lifting off even during unusual temperature loadings, the invention proposes a prestressing device 9 which has spring elements 10 which are preferably formed from spring steel, prestress said lateral end regions 5 against a windshield 2 or against a bodywork 11 and, as a result, prevent the same from lifting off.

The invention claimed is:

1. In combination with a motor vehicle having a windshield, a wind-deflecting device disposed in a region of the windshield, the wind-deflecting device comprising a prestressing device configured and disposed to prestress longitudinal end regions of the wind-deflecting device in a direction towards the vehicle.

2. The wind-deflecting device according to claim 1 configured as a cowl disposed in a transverse direction of the vehicle.

3. The wind-deflecting device according to claim 1, wherein said prestressing device has at least one spring element.

4. The wind-deflecting device according to claim 3, wherein said at least one spring element is formed of spring steel.

5. The wind-deflecting device according to claim 3, wherein said spring element has a first end connected to a bodywork part of the motor vehicle and a second end connected to the wind-deflecting device.

6. The wind-deflecting device according to claim 3, which comprises engagement means formed on the wind-deflecting device, and wherein said spring element has an end facing away from the bodywork of the motor vehicle engaging in said engagement means.

7. The wind-deflecting device according to claim 3, wherein said spring element is formed as a right angled Z profile.

8. The wind-deflecting device according to claim 3, which comprises a covering profile that is visible when the wind-deflecting device is fitted on the motor vehicle and at least one recessed fastening region at which the wind-deflecting device is connected to the motor vehicle bodywork.

9. The wind-deflecting device according to claim 8, wherein a side wall of said recessed fastening region is formed with a through opening (8"), and said spring element reaches through said through opening in a fitted state of the wind-deflecting device.

10. The wind-deflecting device according to claim 8, which comprises a common fixing means commonly attaching said spring element and said covering profile at said recessed fastening region to the motor vehicle bodywork.

* * * * *